July 6, 1926.  1,591,776
C. V. PETERSON
HULLING MACHINE
Filed July 11, 1924      2 Sheets-Sheet 1
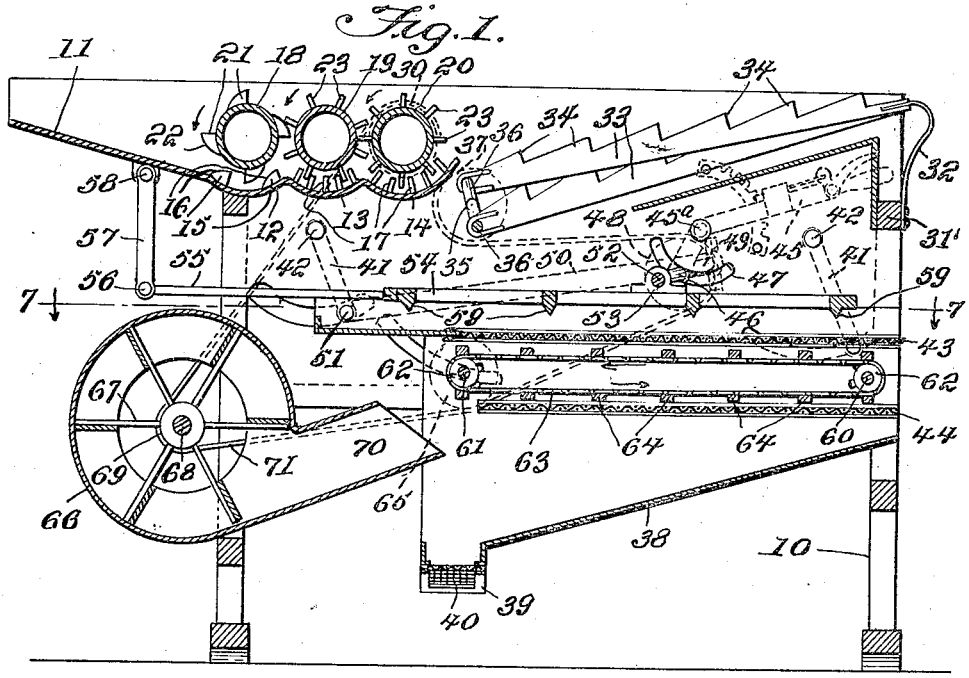
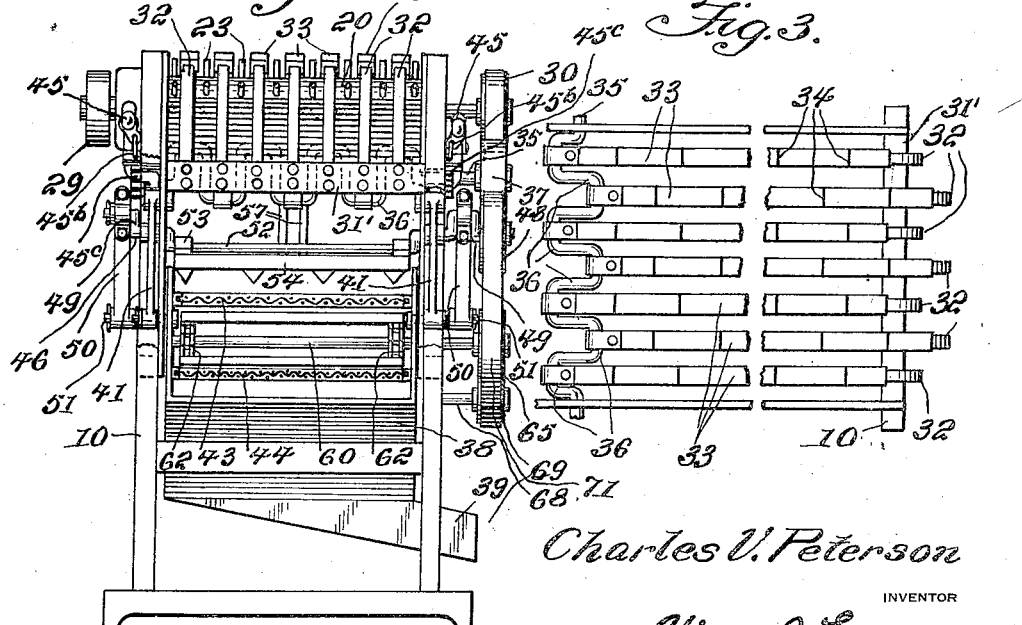
Charles V. Peterson
INVENTOR
BY Victor J. Evans
ATTORNEY
WITNESS:

July 6, 1926.
C. V. PETERSON
HULLING MACHINE
Filed July 11, 1924    2 Sheets-Sheet 2
1,591,776
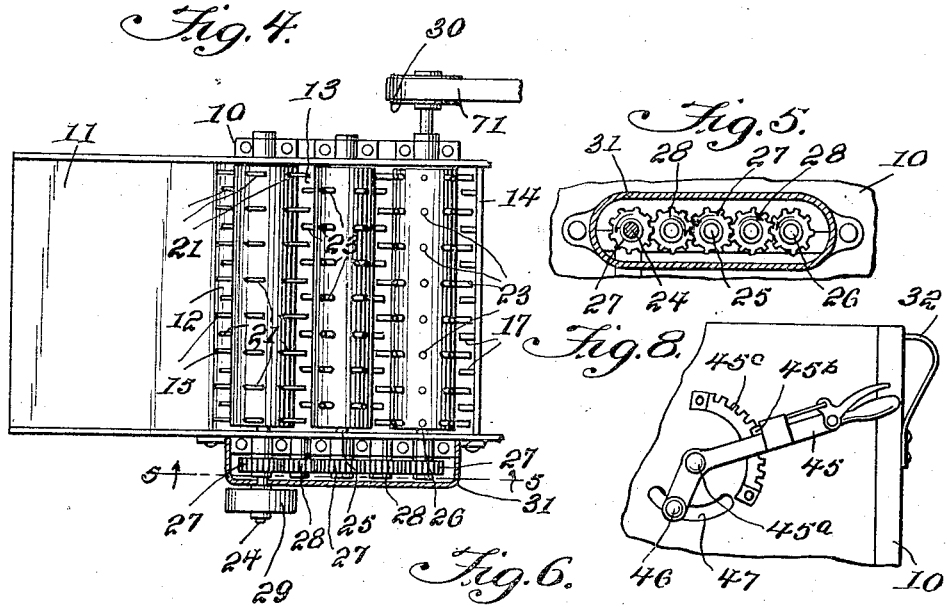
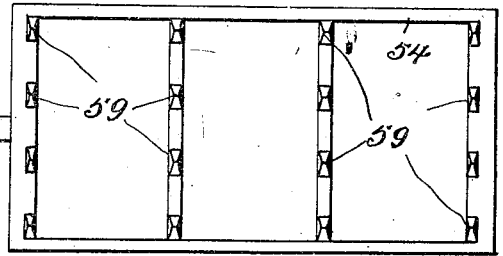
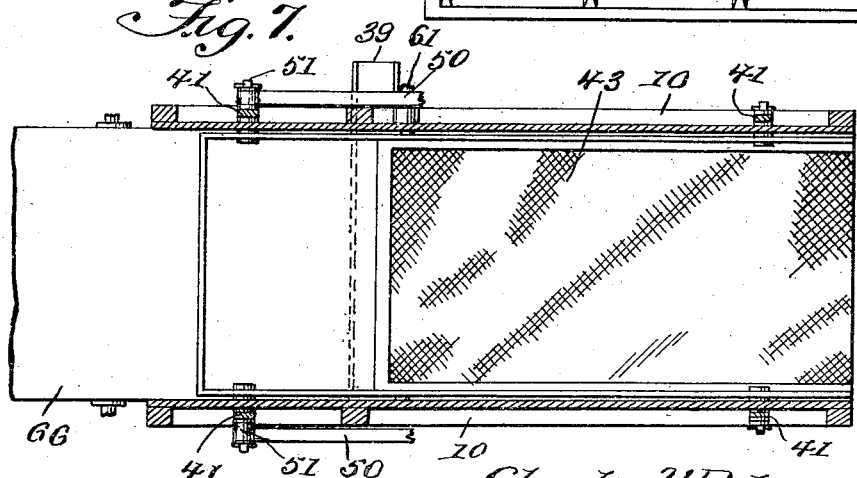
Charles V. Peterson INVENTOR
BY Victor J. Evans ATTORNEY
WITNESS: J.T.L. Wright Patented July 6, 1926.

1,591,776

UNITED STATES PATENT OFFICE.

CHARLES V. PETERSON, OF BRAHAM, MINNESOTA.

HULLING MACHINE.

Application filed July 11, 1924. Serial No. 725,469.

This invention relates to hulling machines, particularly to that type adapted for use in hulling beans and the like, and has for its object the provision of a novel machine for this purpose so constructed and arranged as to break open the pods for extracting the beans, and effectually shaking the entire mass to effect separation of the beans so that they may be collected in a suitable receptacle.

An important object is the provision of a device of this character in which the shaker mechanism is of peculiar construction and so arranged that it may have a much greater degree of movement than is ordinarily the case without danger of disassociation of the parts.

An additional object is the provision of a hulling machine which will be extremely simple and inexpensive to manufacture, positive in action, efficient and durable in service, and a general improvement in the art.

With the above and other objects and advantages in view, the invention consists in the combination and arrangement of parts to be hereinafter more fully described and claimed and illustrated in the accompanying drawings in which:

Figure 1 is a longitudinal section through the device.

Figure 2 is a rear elevation.

Figure 3 is a plan view of the shaker.

Figure 4 is a partial plan view showing the rotary drums mounted above the concaves.

Figure 5 is a section on the line 5—5 of Figure 4.

Figure 6 is a detail plan view of one of the parts of the device.

Figure 7 is a section on the line 7—7 of Figure 1.

Figure 8 is a detail view of an adjustment.

Referring more particularly to the drawings, the numeral 10 designates generally a suitable supporting frame consisting of any necessary number of longitudinal and transverse bars, legs or other elements. Located at the top of one end of this frame is a feed table 11 which leads to three concaves 12, 13 and 14, arranged in series. The concave 12 is formed with two series of blades or knives 15 which have their forward edges 16 inclined and sharpened. The concaves 13 and 14 are provided with rows of teeth or projections 17.

Mounted above the respective concaves 12, 13 and 14 are drums 18, 19 and 20, the former of which carries slanting teeth 21 having sharp edges 22 and the latter two of which carry teeth 23 cooperating with the teeth 17. By this construction a beater is unnecessary and the blades or teeth 21 cooperating with the teeth or blades 15 will act to cut up long weeds which are generally found mixed with the vines, this feature eliminating the trouble caused by winding of the weeds upon and consequent clogging of the cylinders or drums and their concaves.

The drums 18, 19 and 20 are carried by shafts 24, 25 and 26, respectively equipped with gears 27 meshing with intermediate gears 28 so that they will all rotate in the same direction as indicated by the arrows in Figure 1. The shaft 24 carries a pulley 29 and the shaft 26 carries a pulley 30, both of which are for a purpose to be described. To prevent vines or other matter from falling upon these gears and clogging them, I provide a housing 31 surrounding the gears and suitably secured to the frame 10. Power is applied to the pulley 29 for driving the entire mechanism including that already described and that yet to be described.

At the opposite end of the machine is a transverse bar or other supporting member 31 to which are connected resilient, preferably leather, straps 32 connected with the rear ends of elongated shaker bars 33 having upstanding ratchet-like projections or teeth 34 thereon to define a riddle structure. Journaled through the frame is a shaft 35 having a plurality of crank portions 36 engaging through the forward ends of the respective shaker or riddle bars 23 for imparting the requisite movement thereto. This shaft carries a pulley 37.

Mounted at the lower portion of the rear or second mentioned end of the frame is a collecting hopper 38 having a laterally extending discharge chute 39 at its lower end, which chute has its bottom formed as a wire screen 40 or other foraminous material to permit the dropping out of sand and other small particles of a heavy nature. This hopper is carried by hangers 41 pivoted at 42 on the frame, and within the upper portion of the hopper is a screen 43 below which is a second screen 44, the former being of considerably coarser mesh than the latter.

On the sides of the frame are levers 45 pivoted at 45ª and carrying a shaft 46 movable within slots 47 in the frame and carrying a pulley 48. The levers carry latches 45ᵇ cooperating with notched segments 45ᶜ. This shaft is formed with crank portions 49 engaged by pitmen 50 which extend forwardly and which are pivotally connected at 51 with the forward hangers 41. The shaft 46 is formed with other cranks 52 engaged within bearings 53 on a kicker frame 54 having its forward end carrying a link 55 connected at 56 with a hanger 57 which is in turn pivoted at 58 on the underside of the table 11. The kicker frame 54 carries a plurality of depending teeth 59 which are adapted to engage any accumulation of matter on the screen 43 for moving the same to the rear end of the machine and discharging it onto the ground or floor.

Journaled across the hopper are shafts 60 and 61 carrying rollers 62 about which are trained carrier belts 63 which move in the direction of the arrow and which are equipped with transverse cleats 64 moving rearwardly above the screen 44 for discharging any accumulation thereon. The shaft 61 carries a pulley 65.

Mounted beneath the forward end of the machine is a blower casing 66 within which a blower fan 67 of conventional construction is mounted upon a shaft 68 carrying a pulley 69. The blower casing has its discharge 70 located below and somewhat in advance of the screens 43 and 44 for blowing dust and dirt out of the beans or the like as they pass through the screens.

For driving the mechanism, I provide a belt 71 engaging the pulley 69, extending over the pulley 30, under the pulley 37, over the pulley 48, and under the pulley 65. By this peculiar arrangement it will be seen that all the mechanism is driven by means of this one belt, which in turn derives its power from the gears 27 and 28 rotated by the application of power to the pulley 29. Tightening of the drive belt is effected by adjusting the levers 45.

In the operation it is apparent that the bean plants are fed onto the table 11, from which they will be drawn so as to pass between the drums 18, 19 and 20 and their concaves 12, 13 and 14. The teeth 21 and 15 act to cut long vines and weeds and the teeth 17 and 23 operate to tear open the pods and to tear the pods from the vines or plants. The entire mass of broken up matter is discharged from the rear end of the concave 14 onto the shaker bars 33, the inclined teeth 34 of which will eventually move the vines rearwardly so as to discharge them at the rear end of the machine. The beans and fragments of stems, pods, and the like will drop down between the bars 33 onto the upper screen 43, the beans and small particles passing through this screen and onto the screen 44. The weeds, vines and other undesired matter which accumulates upon the screen 43 are moved rearwardly by the kicker frame 54 and are discharged at the rear end of the machine. At all times, there is a strong air blast from the blower which assists in the discharge of the chaff and which removes the dust from the beans as they fall. The screen 44, being of smaller mesh than the screen 43, positively prevents any chaff and débris from passing through so that only clean beans and possibly a little sand will pass into the hopper 38. Sand and such matter falls out through the screen bottom 40 of the discharge chute so that only clean beans pass to whatever receptacle is provided at the outlet end of the chute.

While I have shown and described the preferred embodiment of my invention, it is of course to be understood that I reserve the right to make such changes in the form, construction and arrangement of parts as will not depart from the spirit of the invention or the scope of the subjoined claims.

I claim:

1. In a machine of the character described, a supporting frame having closed sides, a horizontally arranged movable frame including longitudinal members and transverse members, a hanger pivotally mounted on the stationary frame, a connection between said hanger and said movable frame, the closed sides of the stationary frame having arcuate slots therein, bearings on the longitudinal members of said movable frame, a shaft having an intermediate crank portion engaged through said bearings and having other portions movably mounted along said arcuate slots, and a lever mounted exteriorly of the stationary frame and having a link connection with said shaft for varying the position thereof, and means for rotating said shaft.

2. In a machine of the character described, a stationary frame having closed sides, a horizontally arranged longitudinally movable frame suspended within said stationary frame and including longitudinal members and transverse elements of toothlike formation, a shaft extending transversely of said movable frame and provided with crank portions, bearing on the longitudinal members of said movable frame receiving said shaft, the closed sides of the stationary frame having arcuate slots through which the shaft extends, a drive element on said shaft for effecting rotation thereof, and a lever connected with said shaft for varying the position thereof.

In testimony whereof I affix my signature.

CHARLES V. PETERSON.